United States Patent
Kellar

(10) Patent No.: US 11,828,597 B2
(45) Date of Patent: Nov. 28, 2023

(54) FOLDING SAGNAC INERTIA MEASUREMENT UNIT

(71) Applicant: The United States of America, as represented by the Secretary of the Navy, Crane, IN (US)

(72) Inventor: Kevin Kellar, Bloomfield, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/860,174

(22) Filed: Jul. 8, 2022

(65) Prior Publication Data

US 2023/0008033 A1   Jan. 12, 2023

Related U.S. Application Data

(60) Provisional application No. 63/219,473, filed on Jul. 8, 2021.

(51) Int. Cl.
*G01C 19/72* (2006.01)
*G01C 21/16* (2006.01)

(52) U.S. Cl.
CPC ............. *G01C 19/72* (2013.01); *G01C 21/16* (2013.01)

(58) Field of Classification Search
CPC ....... G01C 19/72; G01C 21/16; G01C 19/722
See application file for complete search history.

(56) References Cited

U.S. PATENT DOCUMENTS

| 4,183,670 | A | * | 1/1980 | Russell | G01C 19/72 356/470 |
| 4,762,416 | A | * | 8/1988 | Lefevre | G02B 6/4286 356/460 |
| 5,386,288 | A | * | 1/1995 | Martin | G01C 19/68 356/467 |
| 2004/0223160 | A1 | * | 11/2004 | Chen | G01C 19/722 356/460 |
| 2008/0159684 | A1 | * | 7/2008 | Sanders | G01R 15/246 385/12 |
| 2010/0309473 | A1 | * | 12/2010 | Sanders | G01R 15/246 356/460 |
| 2013/0083327 | A1 | * | 4/2013 | Khalil | G01C 19/661 356/459 |

\* cited by examiner

*Primary Examiner* — Jonathan M Hansen
(74) *Attorney, Agent, or Firm* — Naval Surface Warfare Center, Crane Division; Patrick Law

(57) ABSTRACT

Disclosed is an improved Sagnac interferometer sensor for inertial navigation and guidance systems (e.g., inertial measurement units (IMUs)) that affords a reduced area architecture. The sensor implements optical folding architectures and techniques to increase the optical path length of the Sagnac interferometer. The folding optical architecture increases the total optical path, which thereby increases the total phase difference between two counter-rotating optical beams in the Sagnac interferometer. The technique increases accuracy and durability of IMUs without the need for an increase in size, weight, and cost.

17 Claims, 5 Drawing Sheets

FOLDING SAGNAC INERTIA MEASUREMENT UNIT

CROSS-REFERENCE TO RELATED APPLICATIONS

This application claims priority to U.S. Provisional Application Ser. No. 63/219,473 filed on Jul. 8, 2021, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210066US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to navigation systems. More particularly, the present disclosure pertains to a Sagnac based interferometer that uses optical folding to increase path length to, in turn, increase phase delay without increasing area, size, and weight.

BACKGROUND

Modern navigation systems use a blend of global positioning systems (GPSs) and inertial navigation and guidance systems to determine position. These two technologies are complementary where GPS is stable over long distances but is prone to error over short distances, and inertial navigation and guidance systems tend to accumulate error over long distances but are very stable over short distances. In GPS denied environments, a navigation system is reliant only on the inertial navigation and guidance system.

Concerning inertial navigation and guidance systems, in particular, such systems are ubiquitous in today's world. Although originally developed to control rockets, inertial navigation and guidance systems are now used in not only space vehicles, but in applications such as automobiles, drilling, and even in mobile phones. An inertial measurement unit (IMU), which is the typical unit used for effectuating inertial navigation and guidance, combines various inertial sensors including gyroscopes and accelerometers to provide data to calculate position and velocity. Typically, IMUs are classified into four main technologies: silicon micro-electrical-mechanical systems (MEMS), Quartz MEMS, fiber optic gyroscopes (FOGs), and ring laser gyroscopes (RLGs). There are tradeoffs with each of these technologies and the selection of which particular technologies are used in IMUs is based on weight, size, and cost considerations.

For higher bandwidths and accuracy, as an example, optical gyroscope technologies such as FOGs and RLGs are used. Both of these technologies are based on the Sagnac effect discovered by French physicist Georges Sagnac, who made the observation that light waves moving opposite to each other on a closed path created interference patterns when the path was rotated. Utilization of the Sagnac effect was impractical for functional applications until advances in optics and electronics allowed the development of the RLG in the 1960s, with capability maturing throughout the 1970s to compete with conventional mechanical gyroscopes. While RLGs are considered the most accurate, they are also the most expensive technology. Furthermore, improvements in fiber optic technologies driven by the electronics and telecommunications industries in the 1990s allowed for the development of more stable "solid state" interferometric fiber optic gyroscopes (iFOGs). The technologies of optical gyroscopes, however, are still maturing.

SUMMARY

Provided is an improved Sagnac interferometer sensor for IMUs and RLG, using a reduced area architecture. The sensor implements an optical folding technique to increase the optical path length of the Sagnac interferometer. The folding optical architecture increases the total optical path, which thereby increases the total phase difference between two counter-rotating optical beams in a Sagnac interferometer. The disclosed sensor increases accuracy without the need for an increase in size, weight, and cost.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
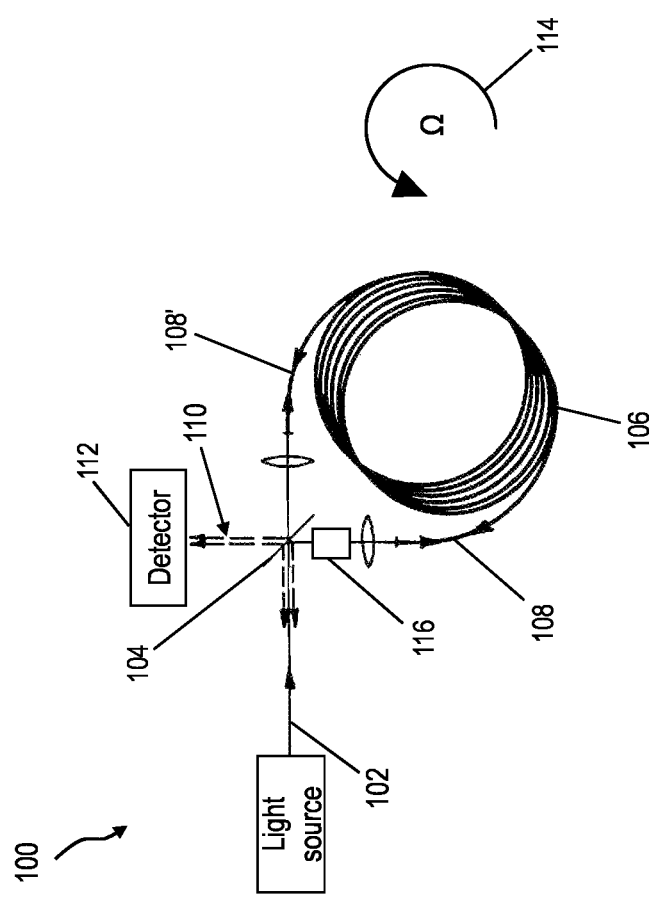
FIG. 1 shows a view of an exemplary fundamental architecture of a Sagnac based interferometer according to some aspects.

FIG. 1 shows a view of an exemplary fundamental architecture of a Sagnac based interferometer 100 that may be utilized in an IMU. The interferometer 100 includes a light beam or light beam source 102, such as a laser light beam, at a particular frequency $\omega$. The beam 102 is directed at a light interface configured as a beam splitter 104 (e.g., a half-silvered mirror), which splits the beam 102 into two counter-rotating beams that travel in at least one light path in respective opposite directions. In this example, the light path is configured as an optical fiber loop 106. The loop 106 may have a number of turns, and the split beams travel in different directions therein as represented by arrows 108 and 108'. The light exiting both ends of the loop 106 is represented at 110, which may be sent to detector 112 to determine the interference between the two counter-rotating beams. Additionally, the angular velocity $\Omega$ of the interferometer 100 shown by arrow 114 will affect the travel of the light beams and change interference there between according to the Sagnac effect, which, in turn, affords determination of inertial navigation.

The following equation governs operation of a Sagnac based interferometer, such as interferometer 100 in FIG. 1. The equation (1) is a follows:

$$\Delta\Phi = \frac{4\omega}{c^2}\vec{A}\cdot\vec{\Omega} \quad (1)$$

where $\Delta\Phi$ represents the phase difference between the two counter-rotating optical beams, $\omega$ is the frequency of the light source, A is the area enclosed by the path of the two optical beams, and $\Omega$ is the angular velocity of a rigid body on which the path is mounted, as an example. Accordingly, it may be seen that the phase difference $\Delta\Phi$ is proportional to both the area A and the angular velocity $\Omega$. The phase difference is directly proportional to the enclosed area, which is further related to the number of turns of the fiber 106. Increased phase delay for the same rotation can be achieved by either adding more turns to the coil or by increasing the total area of the loop. Both cases require more fiber and, therefore, increase the size and weight of the system.

In order to avoid increase of size and weight, the present disclosure provides that a Sagnac based interferometer can also function using a reduced area or a no-area Sagnac interferometer by implementation of folding optics. Accordingly, the presently disclosed Sagnac interferometer sensor is utilized using folding optics, which affords a reduced area architecture and increases the optical path length of the Sagnac interferometer. The folding technique increases the total optical path, which, in turn, increases the total phase difference between two counter-rotating optical beams in the Sagnac interferometer leading to increased accuracy. As an example of just one implementation of a Sagnac interferometer using folding optics, FIG. 1 illustrates an optical folding structure 116 in one light path (e.g., the path in direction 108), but not limited to such location, where structure 116 may be implemented in accordance with the structures illustrated and discussed in relation to FIGS. 2-4 that follow.

It is further noted that the phase delay is adjusted by adjusting or changing the optical path length rather than the area by using optical folding, thus increasing phase delay for the same rotation without increasing area, and without the associated increase in weight and size. In further aspects, the optical path length is an enclosed path with counter-rotating laser beams.

Figure 2:
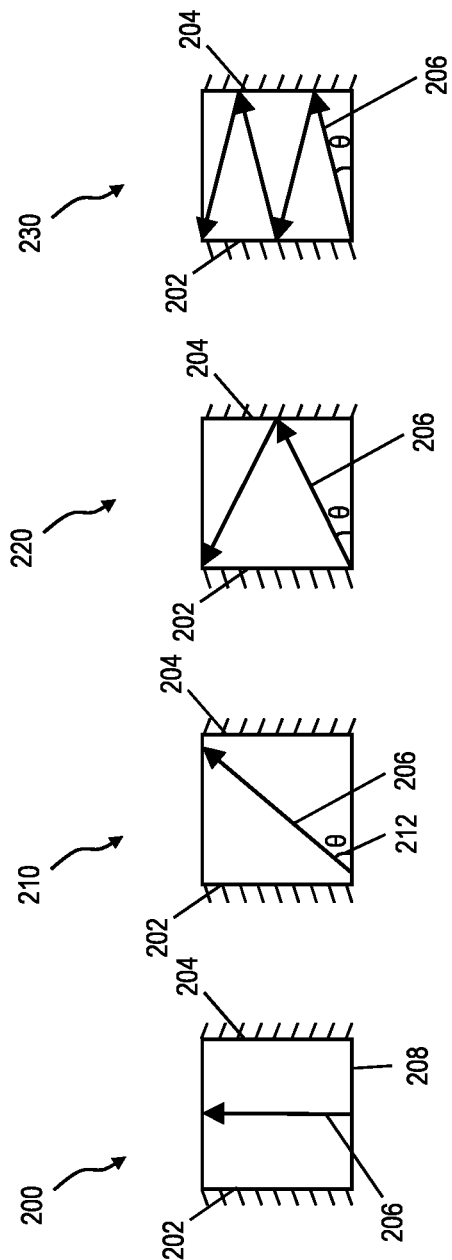
FIG. 2 shows a view of various path lengths of a laser between two parallel plates according to some aspects.

FIG. 2 shows four different views 200, 210, 220, and 230 of different path lengths of a laser beam transmitted between two reflective parallel plates 202 and 204. The laser paths illustrate conceptual views of a one axis design using ray optics approximations. In an aspect, it is noted that Comsol or Ansys software may be used in tuning/design of folding optics for the system in order to provide actual modeling of the path. As may be seen in view 200, a beam 206 perpendicular to the surface 208 travels a shortest distance as no reflection occurs. In view 210, however, the path of beam 206 is longer than in view 200 as the beam is introduced at an angle 212 incident to surface 208, even though no reflection occurs. At view 220, when the angle of incidence $\theta$ is less than that in view 210, the beam 206 will reflect from a side surface (e.g., 204) and the path of travel is longer than view 210. Finally, at view 230 the angle of incidence $\theta$ is less than the angle in view 220 and at least 3 reflections occur as shown, which lengthens the path of travel even further.

Figure 3:
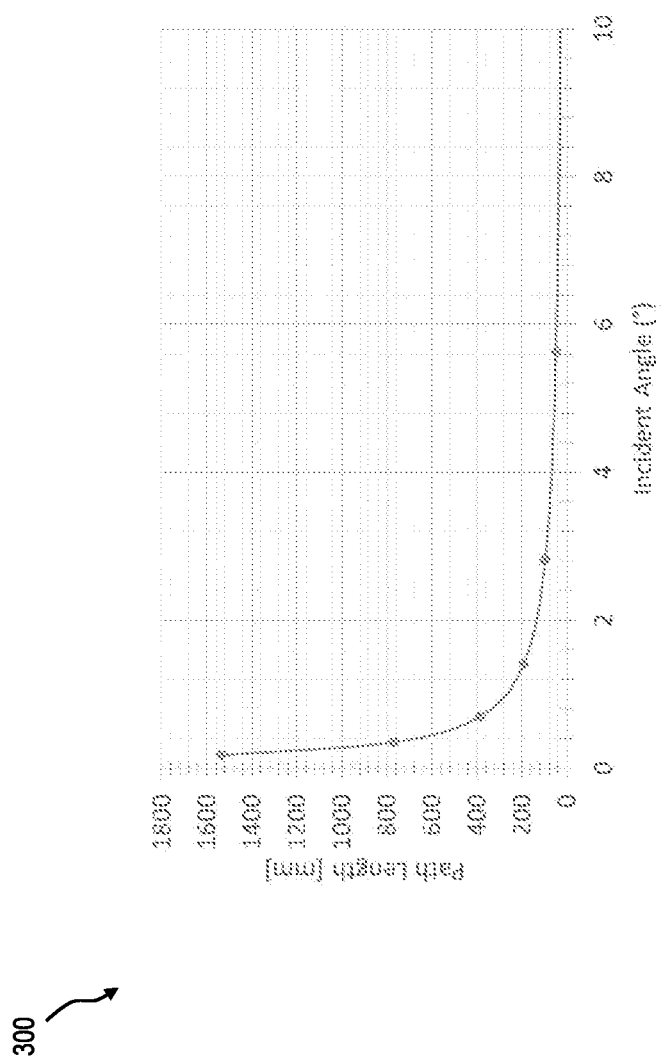
FIG. 3 shows a graph illustrating the relationship between the incident angle of a laser and the total optical path length for optical folding according to some aspects.

FIG. 3 illustrates a graph 300 of a total optical path length as a function of the incident angle $\theta$ of a laser input into an optical folding system such as that shown in FIG. 2, which is an acute angle relative to the input surface of the optical folding system. The graph 300 illustrates how quickly the total path length increases with a decrease in the incident input angle (e.g., angle of incidence $\theta$). It is noted that the graph 300 assumes only one row of the parallel plates. In other alternatives, it is contemplated that multiple rows of plates could be used to further increase overall optical path length.

The effectiveness of optical folding may be tested by performing a comparison between current Sagnac effect based IMUs with a Sagnac effect based interferometer using optical folding (i.e., lengthening the path length). In such testing, the following optical properties are monitored/controlled: (1) polarization, which is controlled so that interference will be achieved; (2) dispersion, such as chromatic, material although these effects are not expected to be a significant concern; and (3) divergence/beam diameter, which may result in a minimum beam input angle although filtering on input/output may ameliorate these effects. Use of folding optics according to the present disclosure may achieve equivalent, if not better, performance than currently available Sagnac interferometers.

Figure 4:
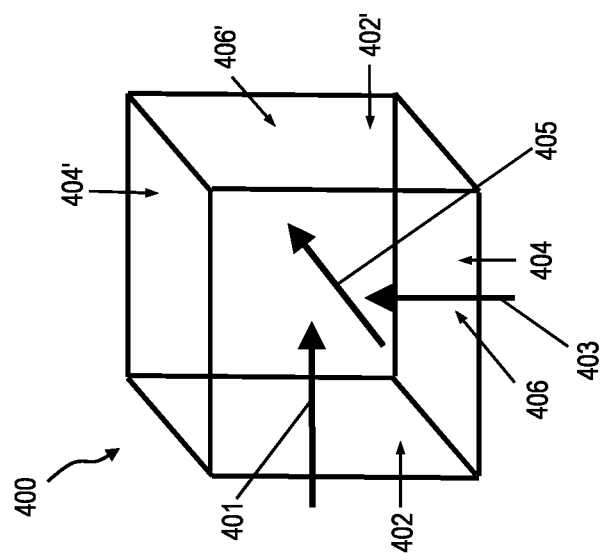
FIG. 4 shows a view of an exemplary volume geometry (e.g., a cube) that may be utilized for optical folding according to some aspects of the present disclosure.

According to further aspects, the structural apparatus for implementing optical folding may be a geometric volume or solid that allows for multiple light axes to be utilized for increasing the optical length of a Sagnac interferometer, while also providing space savings for the interferometer and IMU in which the interferometer is disposed. As one example, FIG. 4 shows a view of a cube geometry 400, which also represents various light axes such a three dimensions such as x, y, and z axes. In this example, the three axes are orthogonal and a cube structure allows incorporation of the three axes into one structure (e.g., cubic structure 400, which is merely one example geometry). In this example, opposite sides of the structure 400 are used for each axis represented by lines 401, 403, and 405. For example, sides 402 and 402' are used for axis 405, top/bottom sides 404 and 404' are used for axis 401, and front/back sides 406 and 406' are used for axis 403. The light for all the axes uses the middle of the cubic structure 400 for light propagation without interfering with each other (i.e., light for each axis does not interfere with light of the other axes). This results in a space saving design that also achieves lengthening of the optical path using optical folding.

Additionally, a solid, optical transparent volume, such as cubic structure or volume 400, may be configured with texturing on the exterior of the volume, which provides for enhanced beam control (i.e., the ability to focus the beam and control divergence) and optical power limiting (OPL). Furthermore, improved environmental and stability effects are afforded due to the rigidity of the volume. Still further, such a structure allows a Sagnac interferometer to be implemented as a silicon photonic. While such implementation is not as sensitive as a bulk interferometer, this nonetheless permits the use of multiple silicon chips to produce increased accuracy.

Figure 5:
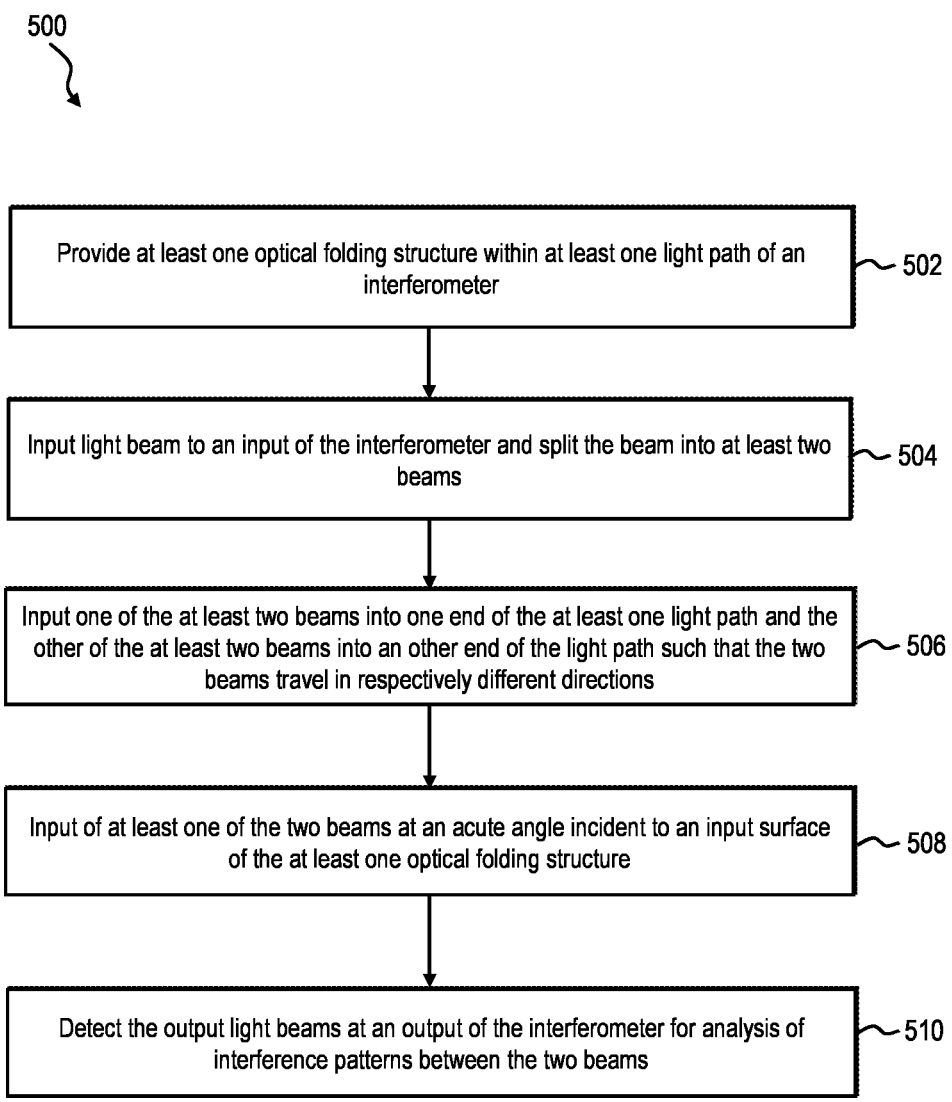
FIG. 5 illustrates a method for providing Sagnac based interferometry according to aspects of the present disclosure.

FIG. 5 illustrates a method 500 for implementing Sagnac interferometry in an IMU according to aspects of the present disclosure. Method 500 includes providing at least one optical folding structure within at least one light path of an interferometer as shown in block 502. As described above, the optical folding structure may be implemented with a pair of reflective parallel plates as shown in the example of FIG. 2, using multiple pairs of reflective parallel plates, or with a volume such as cubic volume 400 shown in FIG. 4. It is additionally noted that the at least one light path may include a combination of a fiber coil such as 106 shown in FIG. 1 and an optical folding structure or device. Further, method 500 includes inputting at least one light beam to an input of the interferometer and splitting the beam into at least two beams as shown at block 504.

After the process of block 504, method 500 includes inputting one of the at least two beams into one end of the at least one light path and the other of the at least two beams into an other end of the light path such that the two beams travel in respectively different directions as shown at block 506. In some implementation, input of at least one of the two beams is made at an acute angle incident to an input surface of the at least one optical folding structure 508, such as was discussed above in connection with FIGS. 2 and 3. In other aspects, the optical folding may be accomplished with a three dimensional structure such as cubic volume 400 shown in FIG. 4. In this latter case, the light at each axis may be introduced at an acute incident angle to cause reflections inside the volume along a path parallel to each axis.

Finally, method 500 includes detecting the output light beams at an output of the interferometer for analysis of interference patterns between the two beams as shown at block 510.

As described above, the presently disclosed Sagnac interferometer structure and methodology using optical folding provides the several advantages over systems known and currently in use. In particular, the disclosed Sagnac interferometer structure provides improved accuracy by improving the optical power limiting (OPL) of the interferometer. Furthermore, the disclosed Sagnac interferometer structure provides size and weight savings because the volume or cavity can be used simultaneously by all three orthogonal axes, such as was discussed in the example of FIG. 4. Additionally, the use of a solid, but optically transparent material serves to increase the mechanical and environmental performance of an IMU utilizing an interferometer with such structure. Other advantages include increased optical performance by using materials with an index of refraction that is greater than one.

Although the invention has been described in detail with reference to certain examples or embodiments, variations and modifications exist within the spirit and scope of the invention as described and defined in the following claims.

The invention claimed is:

1. An inertial measurement unit (IMU) comprising:
a Sagnac interferometer including:
a light source;
an interface configured to receive a light beam from the light source and split the light beam into first and second light beams; and
at least one light path having two ends that are each configured to respectively receive one of the first and second light beams from the interface such that the first and second light beams travel in different directions in the at least one light path, and wherein the at least one light path includes an optical folding structure configured to increase the length of the at least one light path, wherein the optical folding structure includes a plurality of reflective surfaces and at least one input surface perpendicular to at least one of the plurality of reflective surfaces, where the at least one input surface is configured to receive one of the first and second light beams at an acute angle of incidence relative to the at least one input surface to cause light introduced to the optical folding structure to reflect off at least one of the plurality of reflective surfaces to thereby increase a length traveled of the one of the first and second light beams received in the at least one input surface.

2. The IMU of claim 1, wherein the optical folding structure comprises a three-dimensional solid structure configured to allow entry of light beams from two or more axes.

3. The IMU of claim 2, wherein the three-dimensional solid structure comprises a cubic structure composed of a solid, optically transparent material.

4. The IMU of claim 3, wherein the solid, optically transparent material is further configured with texturing on at least a portion of an exterior surface of the volume and configured to cause one or more of enhanced beam control including light beam focus and divergence and optical power limiting (OPL).

5. The EMU of claim 2, wherein the three-dimensional solid structure comprises a silicon photonic material.

6. The IMU of claim 1, wherein the at least one light path includes a combination of the optical folding structure and fiber optic cable.

7. The IMU of claim 1, further comprising:
an output of at least one light path comprising the two ends of the at least one light path; and
a detector coupled to the output via the interface for detecting interference patterns between the light output from the ends after first and second light beams have traveled through the at least one light path.

8. The IMU of claim 1, wherein the interface comprises a beam splitter.

9. The IMU of claim 8, wherein the beam splitter comprises a half-silvered mirror.

10. A navigation and guidance system comprising:
an inertial measurement system including a Sagnac interferometer, the interferometer including:
a light source;
an interface configured to receive a light beam from the light source and split the light beam into first and second light beams;
at least one light path having two ends that are each configured to respectively receive one of the first and second light beams from the interface such that the first and second light beams travel in different directions in the at least one light path, and wherein the at least one light path includes an optical folding structure configured to increase the length of the at least one light path, wherein the optical folding structure includes a plurality of reflective surfaces and at least one input surface perpendicular to at least one of the plurality of reflective surfaces, where the at least one input surface is configured to receive one of the first and second light beams at an acute angle of incidence relative to the at least one input surface to cause light introduced to the optical folding structure to reflect off at least one of the plurality of reflective surfaces to thereby increase a length traveled of the one of the first and second light beams received in the at least one input surface; and
a detector optically coupled to the interface for detecting interference patterns between the light output from the ends after first and second light beams have traveled through the at least one light path.

11. The system of claim 10, wherein the optical folding structure comprises a three-dimensional solid structure configured to allow entry of light beams from two or more axes.

12. The system of claim 11, wherein the three-dimensional solid structure comprises a cubic structure composed of a solid, optically transparent material.

13. The system of claim 12, wherein the solid, optically transparent material is further configured with texturing on at least a portion of an exterior surface of the volume and configured to cause one or more of enhanced beam control including light beam focus and divergence and optical power limiting (OPL).

14. The system of claim 11, wherein the three-dimensional solid structure comprises a silicon photonic material.

15. The system of claim 10, wherein the at least one light path includes a combination of the optical folding structure and fiber optic cable.

16. The system of claim 10, wherein the interface comprises a beam splitter.

17. The system of claim 16, wherein the beam splitter comprises a half-silvered mirror.

\* \* \* \* \*